United States Patent [19]

Stumpe et al.

[11] Patent Number: 5,615,931
[45] Date of Patent: Apr. 1, 1997

[54] METHOD AND APPARATUS FOR REGULATING THE BRAKE SYSTEM OF A VEHICLE

[75] Inventors: Werner Stumpe, Stuttgart; Andreas Schlichenmaier, Zaberfeld; Bernhard Schwendemann, Schorndorf, all of Germany

[73] Assignee: Robert Bosch GmbH, Stuttgart, Germany

[21] Appl. No.: 517,708

[22] Filed: Aug. 21, 1995

[30] Foreign Application Priority Data

Oct. 26, 1994 [DE] Germany .......................... 44 38 222.7

[51] Int. Cl.$^6$ ........................................ B60T 8/18
[52] U.S. Cl. ............................ 303/22.1; 188/195
[58] Field of Search .................. 303/22.1, 22.2, 303/22.5, 22.8, 22.7, 198, 155, 186, 188, DIG. 3, DIG. 1, DIG. 2, DIG. 4, 118.1, 127, 132, 9.61, 9.69, 9, 13, 3, 7; 188/195, 349, 3 R, 3 H

[56] References Cited

U.S. PATENT DOCUMENTS

| | | | |
|---|---|---|---|
| 4,093,316 | 6/1978 | Reinecke | 303/198 |
| 4,436,347 | 3/1984 | Stumpe | 303/15 |
| 4,585,278 | 4/1986 | Grauel et al. | 303/15 |
| 4,616,881 | 10/1986 | Muller et al. | 303/15 |
| 4,664,452 | 5/1987 | Kubota et al. | 303/22.8 |
| 4,667,557 | 6/1987 | Stumpe | 303/9.69 |
| 4,682,823 | 7/1987 | Honmen et al. | 303/22.2 |
| 4,712,839 | 12/1987 | Brearley et al. | 303/22.1 |
| 4,714,299 | 12/1987 | Takata et al. | 188/181 A |
| 4,768,840 | 9/1988 | Sullivan et al. | 188/195 |
| 4,795,219 | 1/1989 | Brearley et al. | 303/22.1 |
| 4,804,237 | 2/1989 | Gee et al. | 303/9.69 |
| 4,861,115 | 8/1989 | Petersen | 303/198 |
| 5,002,343 | 3/1991 | Brearley et al. | 303/22.1 |
| 5,004,300 | 4/1991 | Brearley et al. | 303/15 |
| 5,088,042 | 2/1992 | Brearley et al. | 303/9.62 |
| 5,211,449 | 5/1993 | Amtsfeld | 303/198 |
| 5,328,251 | 7/1994 | Brearley | 303/9 |
| 5,338,106 | 8/1994 | Rothen et al. | 303/9.69 |
| 5,403,072 | 4/1995 | Kilian et al. | 303/22.1 |
| 5,443,306 | 8/1995 | Broome | 303/15 |
| 5,460,434 | 10/1995 | Micke et al. | 303/15 |
| 5,496,098 | 3/1996 | Brearley | 303/22.2 |

FOREIGN PATENT DOCUMENTS 01739543 3/1996 European Pat. Off. ........... 303/198

*Primary Examiner*—Douglas C. Butler
*Attorney, Agent, or Firm*—Felfe & Lynch

[57] ABSTRACT

At least one measurement device detects the wheel load or axle load of the vehicle on at least one wheel, and an electronic control unit produces control signals for the wheel brakes at least as a function of the braking demand from the driver and of the detected wheel load or axle load selecting from characteristic brake pressure profiles the profile prescribing the required brake pressure based on driver's braking demand and the load state of the vehicle determined from the load state of the wheel or of the axle, and controlling the brakes in accordance with this profile during the braking process.

8 Claims, 7 Drawing Sheets

METHOD AND APPARATUS FOR REGULATING THE BRAKE SYSTEM OF A VEHICLE

PRIOR ART

The invention relates to a method and a device for controlling or regulating the brake system of a vehicle, it being possible to control or regulate the brake system electronically, and the brake system preferably being electropneumatic, electrohydraulic or electrical.

In the case of such brake systems, in order to improve the braking process it is desirable to take account of the axle load shift which occurs during braking in the control or regulation of the brake system. Various solutions for taking account of the axle load shift during the braking process are known from the prior art for controlling or regulating the brake system. A common feature of these known solutions is that high-power computation is required during the braking process, as well as complex calculation processes having a high level of computation complexity. In some cases, this additionally results in an unsatisfactory transient behavior or braking behavior. This is seen, for example, in the solution which is known from U.S. Pat. No. 4,714,299. There, an electronic braking force regulator is proposed in which the vehicle weight is calculated using the brake pressures and the deceleration, and a new brake pressure distribution is thus determined. Thus, it is necessary to produce a coupling between the brake pressure, the deceleration and the corrected brake pressure in order to determine the brake pressure distribution, which coupling requires both a high level of computation complexity and a long time for the system to settle.

The object of the invention is thus to specify measures for load-dependent control or regulation of a brake system, in the case of which measures the computational power required during the braking process is considerably reduced.

SUMMARY OF THE INVENTION

The procedure according to the invention considerably reduces the computation complexity for load-dependent determination of the brake pressures at the individual wheels during the braking process. In consequence, the method of operation of the brake system is considerably improved since a large number of channels can be processed during the braking process. In particular, the procedure according to the invention makes possible rapid, multi-channel, in particular wheel-specific brake pressure regulation.

It is particularly advantageous in this case that cost-effective computer systems can be used.

It is particularly advantageous that the load-dependent calculation of the individual brake pressures can be adapted, within predefined limits, to the current operating conditions of the vehicle and of the brake system. At the same time, a further advantage is the possibility of indicating a fault if tolerance limits are exceeded.

The procedure according to the invention loads the computer or computers in the electronic control of the brake system with only those data which change during the operation of the vehicle.

DESCRIPTION OF THE EXEMPLARY EMBODIMENTS

Figure 1:
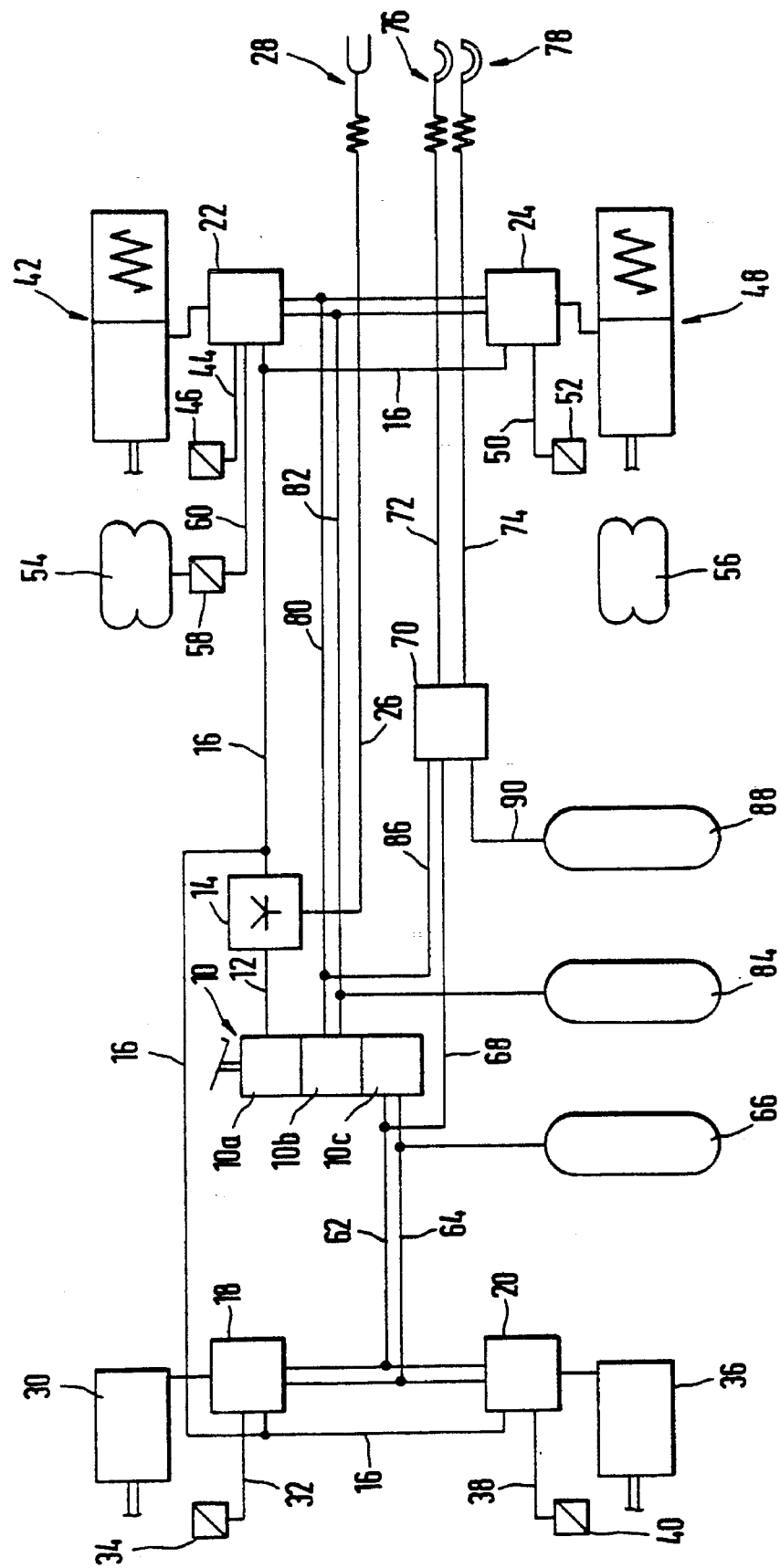
FIG. 1 is a schematic of an electrically controlled brake system.

FIG. 1 shows a circuit diagram of a preferred electrical controllable brake system. The illustrated brake system is of the electropneumatic type. A brake operating valve 10, which can be operated by the driver, has an electrical part 10a as well as two pneumatic parts 10b and 10c for detecting the driver's demand. The electrical part 10a is connected to an electronic controller 14 via an electrical line 12. The controller 14 is connected via a communications system 16 to pressure regulating modules 18, 20, 22 and 24 which are each linked to the wheel brake cylinders of the vehicle. Furthermore, a line 26, connects the controller 14 by a plug connection 28 to a regulating module on the trailer. Input lines are in each case connected to the pressure regulating modules and connect the latter to sensors for detecting the rotation speed, wear or temperature. The pressure regulating module 18 which is assigned to the wheel brake cylinder 30 is thus connected via the line 32 to the sensor 34, the pressure regulating module 20 which is assigned to the wheel brake cylinder 36 is connected via the line 38 to the sensor 40, the pressure regulating module 22 which is assigned to the wheel brake cylinder 42 is connected via the line 44 to the sensor 46, and the pressure regulating module 24 which is assigned to the wheel brake cylinder 48 is connected via the line 50 to the sensor 42. Furthermore, by way of example, FIG. 1 illustrates two air-spring bellows 54 and 56, the air-spring bellows 54 being connected to a sensor 58 for pressure detection and thus for detecting the axle load, whose output line 60 is connected to the pressure regulating module 22.

The sensors for detecting the brake pressure are integrated in the pressure regulating modules. Their measurements can be passed via the communications system to the control unit.

The pneumatic part of the brake system comprises two brake circuits, the front axle and rear axle preferably being separated. A first brake circuit comprises the pneumatic part 10c of the operating brake valve 10, which is connected via a pneumatic braking signal line 62 and a supply line 64 to the pressure regulating modules 18 and 20. A pressure reservoir 66 is assigned to the supply line 64. Furthermore, a brake signal line 68 leads from the line 62 to the trailer control valve 70, from which a braking signal line 72 (drivers braking demand) and a pneumatic supply line 74 lead to the coupling heads 76 and 78 for connection to a trailer brake system. The second brake circuit comprises the pneumatic part 10b of the operating brake valve 10, which is linked via the braking signal lines 80 and the supply line 82 to the pressure regulating modules 22 and 24. The reservoir 84 is assigned to the supply line 82. Furthermore, a braking signal line 86 is connected from the line 80 to the trailer control valve 70. A further reservoir 88 is connected via the line 90 to the trailer control valve 70 for supplying pressure to the trailer brake system. The parts which produce the air (air compressor, pressure regulator, safety valve) are not illustrated here.

The brake system which is described in FIG. 1 can be controlled or regulated electrically. For this purpose, the controller 14 detects the driver's braking demand on the basis of the level of operation or the operating force which is determined by the electrical part 10a of the operating brake valve 10 and is transmitted via the line 12. This driver's braking demand is converted into required values for the brake controller on the basis of predetermined relationships. In the preferred exemplary embodiment, required pressure values for the individual wheel brakes are determined on the basis of predetermined characteristics from a reference value, using the basis of the driver's braking demand. These characteristics are passed to the individual pressure regulating modules via the communications system 16. The pressure regulating modules regulate the pressure in the wheel brake cylinders as part of a pressure control loop. For this purpose, the actual pressure is determined by means of the pressure sensors, which are assigned to the wheel brake cylinders, in the pressure regulating module. The axle load sensor 58 is provided in the exemplary embodiment according to FIG. 1 in order to take account of the axle load and changes to it. This axle load is detected by the pressure regulating module 22 and is transmitted via the communications system, as well as the pressure values if appropriate, to the electronic controller 14. There, the axle loads of the other wheels are deduced by means of programmed characteristics from the axle load which has been detected on an air-spring bellows in the vehicle, and the assignment of reference variable to the required pressure value is varied appropriately. In order to control a trailer brake system which can be controlled or regulated electrically, the reference variable is transmitted in a corresponding manner via the line 26 and the plug connection 28 to the trailer brake system. In emergencies, the vehicle can be braked via the pneumatic brake circuits as a function of brake pedal operation.

The procedure described in the following text is used not only in the preferred exemplary embodiment of a brake system illustrated in FIG. 1 but in other electrical and electronic brake systems of an electropneumatic, electrohydraulic or purely electrical nature, as are known from the prior art.

Furthermore, in the preferred exemplary embodiment, only one axle load sensor is illustrated on one air-spring bellows. The procedure according to the invention can also be used in an advantageous manner in brake systems in which the axle loads of the other bellows 56 of an axle are sensed. Axle load measurements are also known on axles using leaf-spring suspension. In addition, in a further advantageous exemplary embodiment, the axle load detection is not only limited to the rear axle of prime movers but can also be determined for the front axle and/or trailer axles. On vehicles having trailers, the axle load can likewise be determined on the individual wheels or axles, or on all the axles. The corresponding methods for direct and indirect axle load measurement are known to the person skilled in the art.

Not only is the pressure presetting or pressure regulation provided in the preferred exemplary embodiment implemented in the controller 14, but the electronic brake system in this case also comprises program elements for detecting the application pressure of the wheel brakes, the brake lining wear, the adhesion between the wheel and the road, the brake temperature and the braking on the basis of the wheel rotation speeds. At the same time, vehicle deceleration regulation, coupling force regulation, and brake torque or brake force regulation can be superimposed on the indicated brake pressure regulation. Furthermore, the brake controller can be modified with respect to the application pressure of the wheel brakes, the brake lining wear, the adhesion between the wheel and the road and the brake temperature etc. This is not described in the following text.

The basic idea of the procedure according to the invention for taking account of the axle loads during the braking process is that optimum loading of the computer during the non-braking phase and during the braking phase is achieved from the physical assignment of the braking demand, the wheel or axle load and brake pressure, by splitting up the computation step. The computation power required during the braking process is in consequence reduced. The essence of the procedure according to the invention is that, at the end of the vehicle production line, the characteristic pressure profiles for this vehicle, which comprise all the essential steady-state and dynamic functional relationships, are loaded in the electronic controller. The braking regulation strategy which is used in this case is irrelevant. The instantaneously required brake pressure distribution (load state of one vehicle) is then determined from the axle or wheel load signals in the non-braking phase during continuous operation, and the brake pressures to be used for regulation purposes are determined from this during braking, on the basis of the stored, characteristic pressure profiles. In addition to this, in a preferred exemplary embodiment, the predetermined typical characteristics are matched or adapted to the instantaneous changes, within the limits of predetermined tolerance bands.

Predetermined characteristics and fields of characteristics are stored in the controller 14 in such complex control systems, which characteristics and fields of characteristics are loaded into the central electronic controller during the described end-of-line programming at the end of the vehicle production line, and are stored in a memory module which is fitted into the controller 14. In accordance with the procedure according to the invention, basic brake pressure characteristics for defined load states are loaded into the electronic controller during this end-of-line programming, which characteristics describe the dependency of the brake pressure on the instantaneous load state in non-braking operation and on the driver's braking demand.

In a preferred design, basic brake pressure characteristics for the various axles of the vehicle are in this case adopted for two defined load states, the load state when the vehicle is empty and the load state when the vehicle is fully loaded. In other advantageous exemplary embodiments, more than two such basic brake pressure characteristics can also be provided, for example at half load etc. Interpolations between these predetermined characteristics are carried out in order to determine the actual brake pressure to be used for control purposes.

Such characteristics for one preferred exemplary embodiment are sketched in FIGS. 2 to 7.

Figure 2:
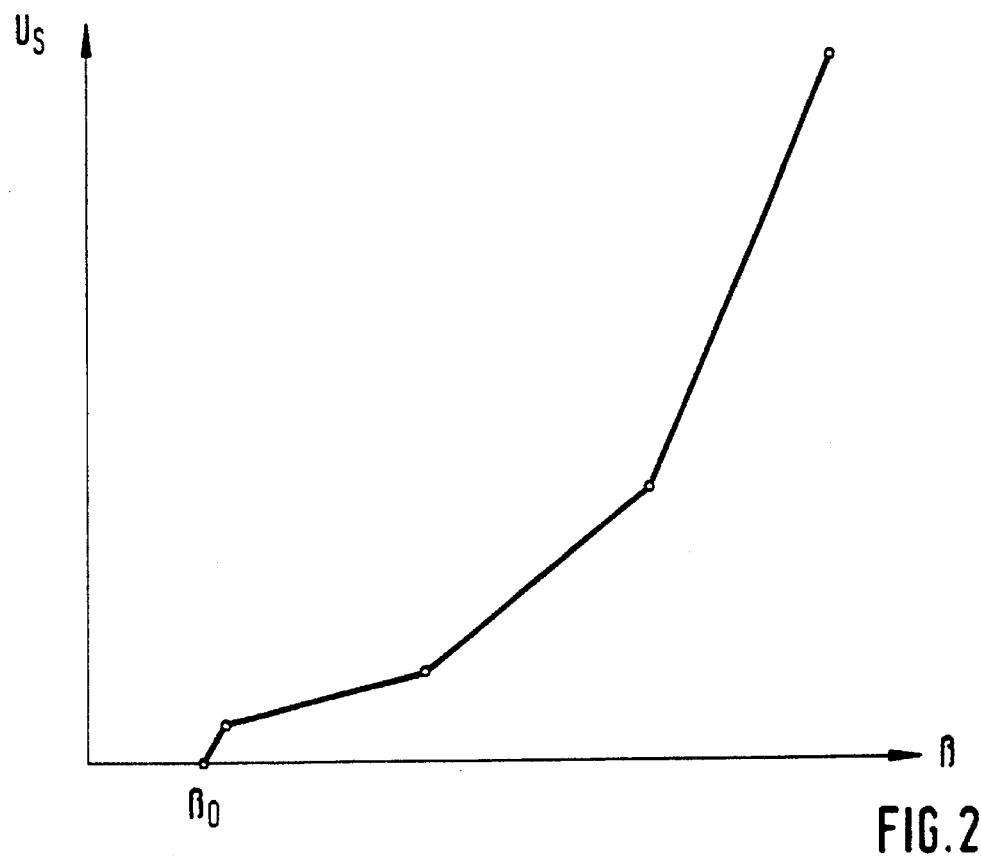
FIG. 2 is a plot of reference value $U_s$ which represents driver's braking demand versus brake pedal position B.

In this case, FIG. 2 shows the assignment of the brake pedal operation β (position or operating pressure of the brake pedal) to a reference value US which represents the driver's braking demand without taking account of the dependency on load. In this case, a reference value US is not emitted until the brake pedal has been operated to the value β0.

Figure 3:
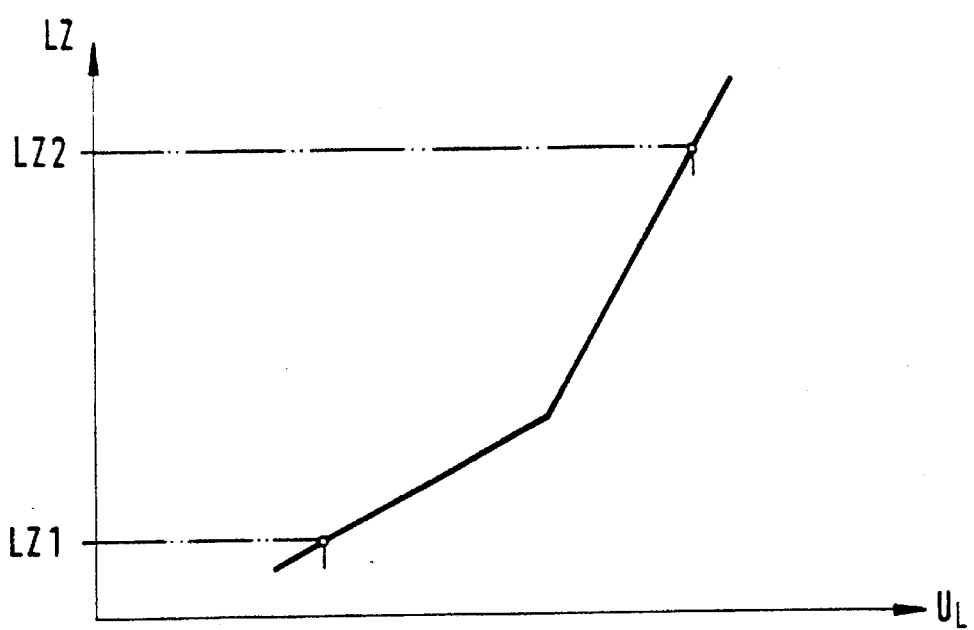
FIG. 3 is a plot of characteristic load states LZ versus measured load $U_1$.

FIG. 3 illustrates the relationship between the load measurements (load value UL) which are detected by the at least one axle load sensor 58 and the load state LZ which results for an assumed axle design. In this case, two characteristic load states, LZ1 for the empty vehicle and LZ2 for the fully loaded vehicle, are shown. This load state is determined for an axle if an axle-based pressure preset is used, and for each wheel if a wheel-specific pressure preset is used.

Figure 4A:
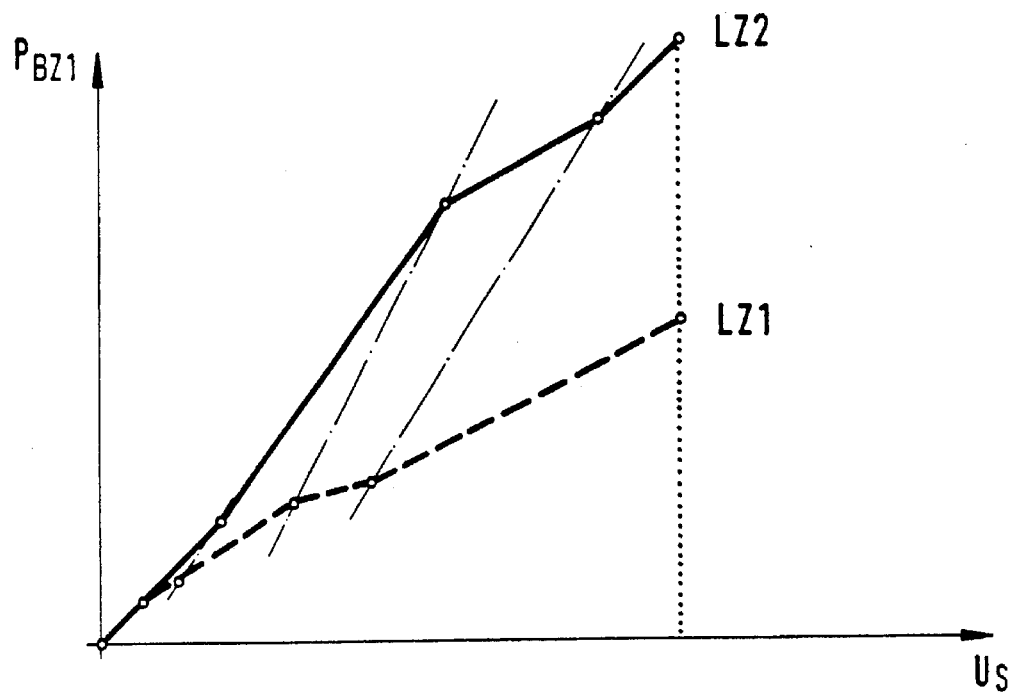
FIG. 4a is a plot of brake pressure PBZ1 of the first axle versus reference value $U_s$ for the empty load state LZ1 and LZ2.
Figure 4B:
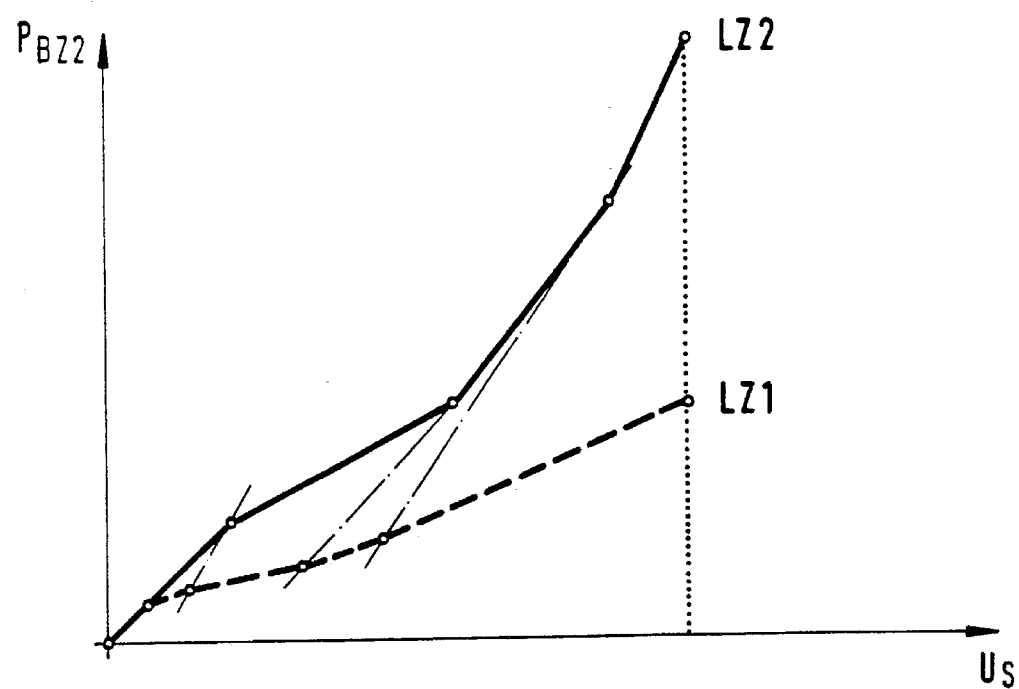
FIG. 4b is a plot of brake pressure PBZ2 at the second axle versus reference value $U_s$ for load states LZ1 and LZ2.

The required brake pressure profiles for these characteristic load states are predetermined. They are illustrated, by way of example, in FIG. 4 for two axles of a vehicle, for the two load states LZ1 and LZ2. In this case, FIG. 4a shows the dependency of the brake cylinder pressure PBZ1, which is to be set, on the reference value US for a first axle, for the load state LZ1 (dashed line) and for the load state LZ2 (solid characteristic). FIG. 4b shows the corresponding situation for the dependency of the brake cylinder pressure PBZ2 of the axle second on the reference value US. These basic brake pressure characteristics are calculated or determined from the legal requirements for brake pressure distribution and for braking assignment in accordance with EC Guideline 71/320/EEC. Vehicle data for load distribution (center of gravity position), the vehicle masses, the desired deceleration profile and the data on the brake system and the tires are used for this purpose. The choice of the basis of the basic brake pressure characteristics can be preset as desired within the framework of the legal requirements. At the same time, the application pressure of the wheel brakes, the brake wear, the adhesion between the road and the wheel, the braking and the brake temperature can also be significant. The essential feature is that, in a preferred exemplary embodiment, the basic brake pressure characteristic is determined for at least two designed load states, preferably for the empty state and for the fully loaded state. FIGS. 4a and 4b each show, by way of example, two basic braking characteristics which have been found to be suitable in a preferred exemplary embodiment. In this case, it must be noted that the brake cylinder pressure is predetermined for one axle in this preferred exemplary embodiment. In other advantageous exemplary embodiments, the brake cylinder pressure can be predetermined for the individual wheel brakes. Four diagrams for the basic brake pressure characteristics according to FIGS. 4a and b would be provided for a two-axle vehicle. Furthermore, in the case of a vehicle which is provided with more than two axles, the basic brake pressure characteristic can be predetermined in an axle-specific or wheel-specific manner.

The interpolation between the basic brake pressure characteristics as a function of the determined load state is sketched by the dashed-dotted lines which show the course of the characteristic points when the load state changes. The interpolation between the two predetermined brake pressure characteristic values is in this case preferably linear.

Figure 5:
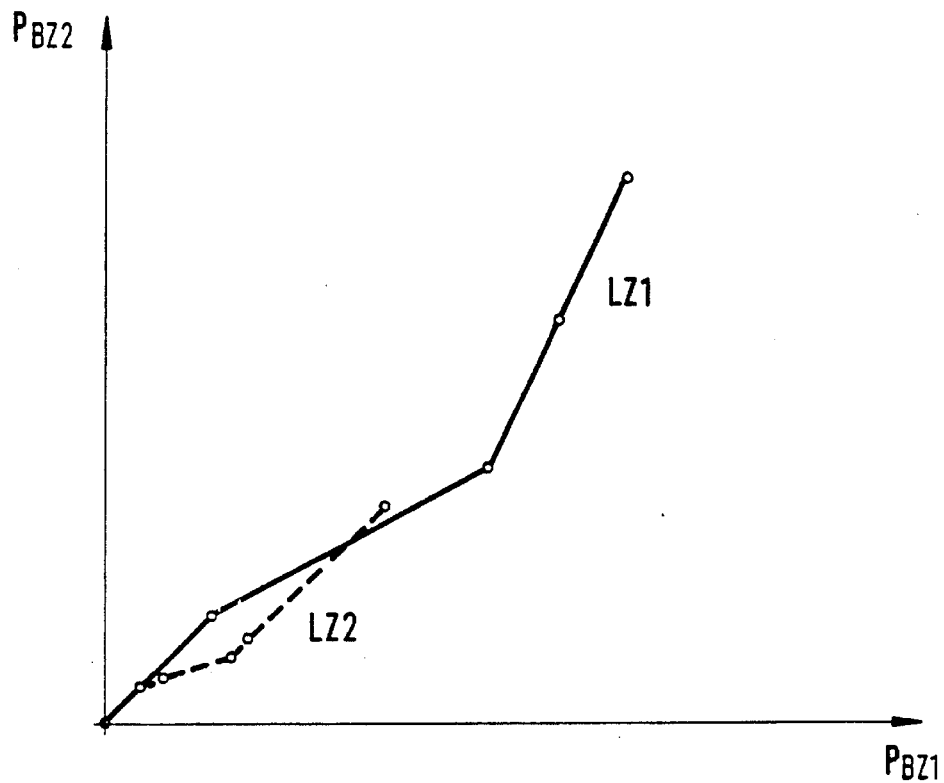
FIG. 5 is a plot of PBZ1 versus PBZ2 for the load states LZ1 and LZ2.

FIG. 5 shows the relationship between the brake cylinder pressure for the first axle and the brake cylinder pressure for the second axle, for the two load states LZ1 (solid line) and LZ2 (dashed characteristic) for the preferred exemplary embodiment according to FIGS. 4a and 4b. This brake pressure profile has been found to be suitable in a preferred exemplary embodiment and takes account of both the changed vehicle masses and the position in the legally specified braking band. A first region (the region from the origin to the first point) provides an assignment until application of the friction brakes. In the second region (between the first point and the second point), the braking force distribution between the first axle and the second axle remains constant, account being taken of the changed vehicle masses. In the third region (between the second point and the third point), the pressure distribution is matched to a uniform road adhesion stress on the braked wheels, and this continues in the fourth region. In the fifth region (between the fourth point and the fifth point) which is illustrated after this, the brake pressure is distributed for optimum deceleration, taking account of stability criteria during braking.

The characteristic bend points in the basic characteristics are entered via the end-of-line programming. The control electronics determine its intermediate values using known interpolation methods.

Figure 6:
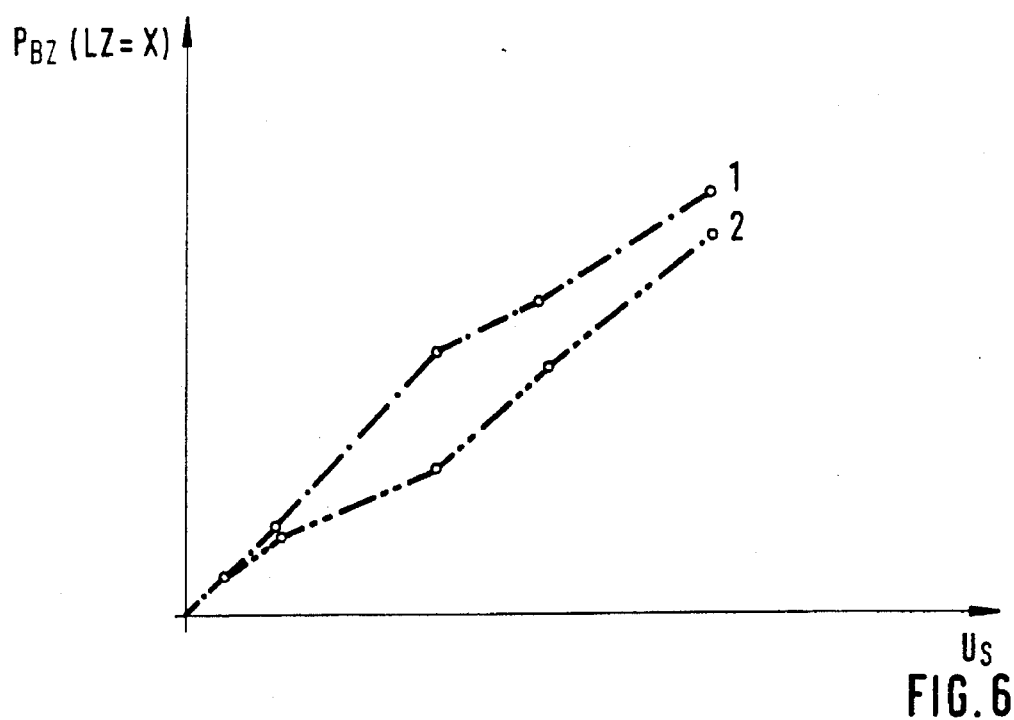
FIG. 6 is a plot of brake cylinder pressure PBZ versus reference value $U_s$ at the two axles for any desired load X.

The relationship shown in FIG. 6 between the reference value US and the brake cylinder pressure PBZ for the first axle (1) and the second axle (2) results for any desired load states LZX.

Figure 7:
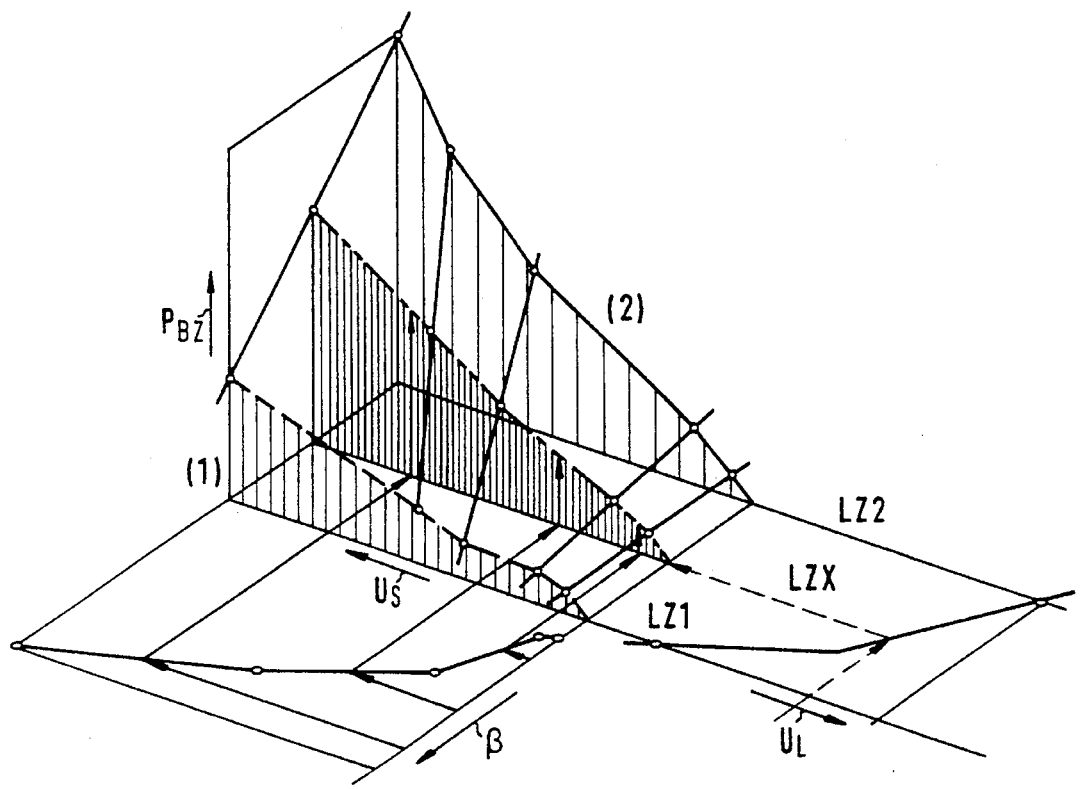
FIG. 7 is a three dimensional representation of brake pressure PBZ as a function of load states LZ determined by axle loads $U_L$, reference value $U_s$, and pedal position $\beta$.

FIG. 7 shows a summary of the illustrated characteristics, as a three-dimensional family of characteristics. The brake cylinder pressure PBZ for an axle or a wheel results as a third dimension as a function of the load state LZ, which is determined on the basis of the measured wheel or axle load or loads UL in accordance with the horizontal characteristic, and the reference value US, which is determined on the basis of the brake pedal operation β by means of the horizontal characteristic in the foreground. The basic characteristics for the load state 1 and the load state 2 are permanently predetermined in the preferred exemplary embodiment in this case, while the characteristic for the load state X is interpolated. A plurality of brake pressure characteristics can be predetermined in other advantageous exemplary embodiments, and the accuracy of the axle-load-dependent brake pressure distribution can thus be improved. The brake pressure which is to be set is calculated by interpolation on the basis of the characteristic values of the LZ1 characteristic and LZ2 characteristic for the instantaneous value US of the instantaneous load state LZX.

Figure 8:
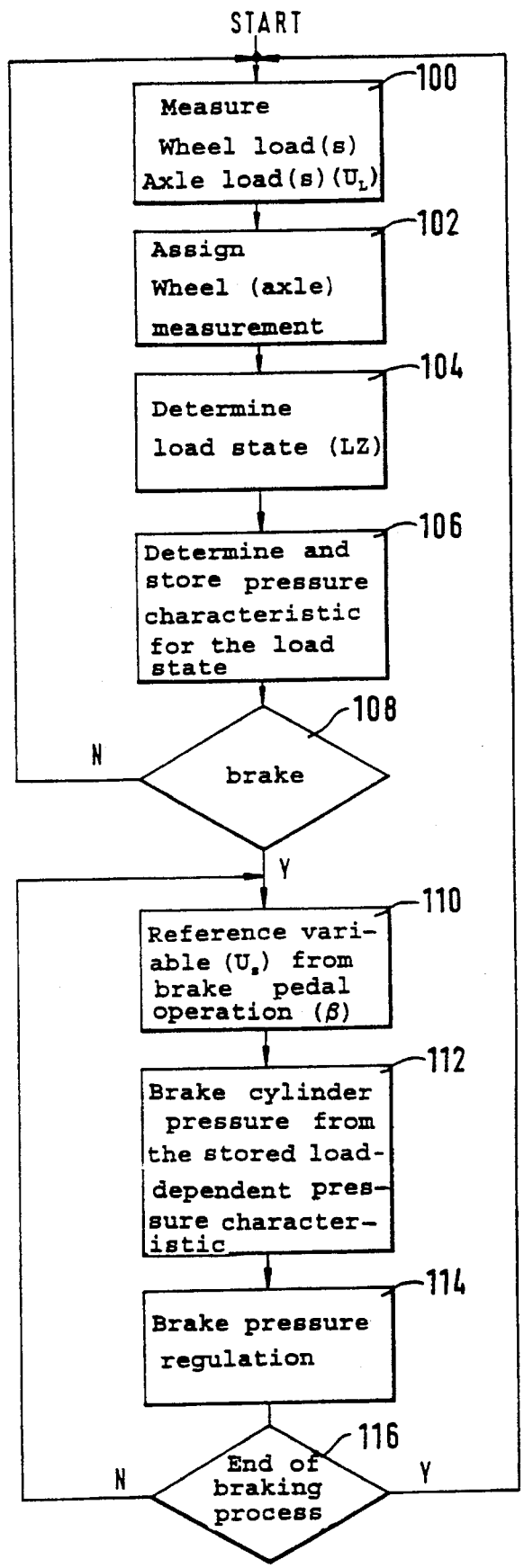
FIG. 8 is a flow chart of the characteristic determination and brake pressure regulation.

The way in which the procedure according to the invention is carried out is illustrated in FIG. 8 using a flow chart for one axle or one wheel brake, which flow chart sketches a computer program which runs in the microprocessor or microprocessors of the electronic control unit.

After the program section starts when the vehicle is started and the brake system is initialized, the wheel or axle loads, or the wheel load or axle load, is or are measured in a first step 100. In step 102, the measurements are assigned to the wheels or axles by means of the predetermined assignment. For example, in the case of an axle load sensor which is assigned to the front axle and one which is assigned to the rear axle, the measurement from the front axle sensor is assigned to this axle, while the measurement of the sensor for the rear axle is assigned to the rear axles. The load state is then determined for the relevant axles in accordance with the stored characteristic (step 104). The instantaneous brake pressure characteristic is determined and stored from the basic characteristics, by interpolation or extrapolation, in the next step 106, using the determined instantaneous load state LZ. In non-braking operation, step 106 is then followed by a load-dependent brake pressure assignment which corresponds to the instantaneous operating conditions. A check is carried out in the next decision step 108, to determine whether the brake pedal is being operated. If this is not the case, the program section is repeated in step 100. If the brake pedal is being operated, that is to say a braking process is being initiated, step 110 then determines, in an advantageous manner, the reference value US from the brake pedal operation β, using the predetermined characteristic, and then, in the next step 112, the brake cylinder pressure for the axles or wheel brakes is read from the stored load-dependent pressure characteristic in accordance with the reference value US, and brake pressure regulation is carried out, if appropriate, in step 114. A check is then carried out in step 116 to determine whether the braking process has been completed, that is to say whether the brake pedal has been released. If this is not the case, the program section is repeated in step 110 and if this is not the case, the program section is repeated with step 100.

It can thus be confirmed that steps 100 to 108 are repeated when at rest and when driving without braking. In this case, the electrical load signal values are normally filtered. In addition, a further improvement in the brake pressure regulation can be carried out in another design, by means of further attenuation and splitting into a steady-state and dynamic load. In this case, a dynamic load state is determined which is derived from measurements which are unfiltered or are filtered only slightly, while a steady-state load state is derived from the heavy filtered or attenuated load measurements in step 106 in FIG. 8. The steady-state load distribution and the dynamic load distribution for brake pressure regulation are determined by means of appropriate characteristics in selected cycles by jumping back after step 114 (before 116) to step 100, in accordance with FIG. 8.

The selection of the steady-state brake pressure characteristics is then carried out while driving without braking. The pressure which must currently be set in the wheel brake cylinder can be determined very quickly during the braking process on the basis of the selected brake pressure assignment. The computer is thus relieved of load during the braking process, since it need take account only of permanently predetermined assignments. The dynamic load can be determined (for monitoring or adaptation), without being binding, in only a few cycles.

The predetermined brake pressure characteristics are adapted for further improvement. In this way, changes in the course of operation of the vehicle are taken into account. The basic idea of adaptation of the basic braking characteristic is that, by comparing the required and actual values of the desired functional states for example of the application pressure of the brakes, the brake lining wear, the adhesion, the braking, the brake temperature, the coupling forces and the coordination with the prime mover/trailer interface, etc. lack of correspondence will be found and the instantaneous characteristic points will be adapted in order to produce equality of the required and actual value. In this case, a window which comprises upper and lower limit values of the characteristic points is predetermined in an advantageous manner. If the required correction is greater than that allowed by the tolerance limits, a fault message or a warning can be produced for the driver.

Figure 9:
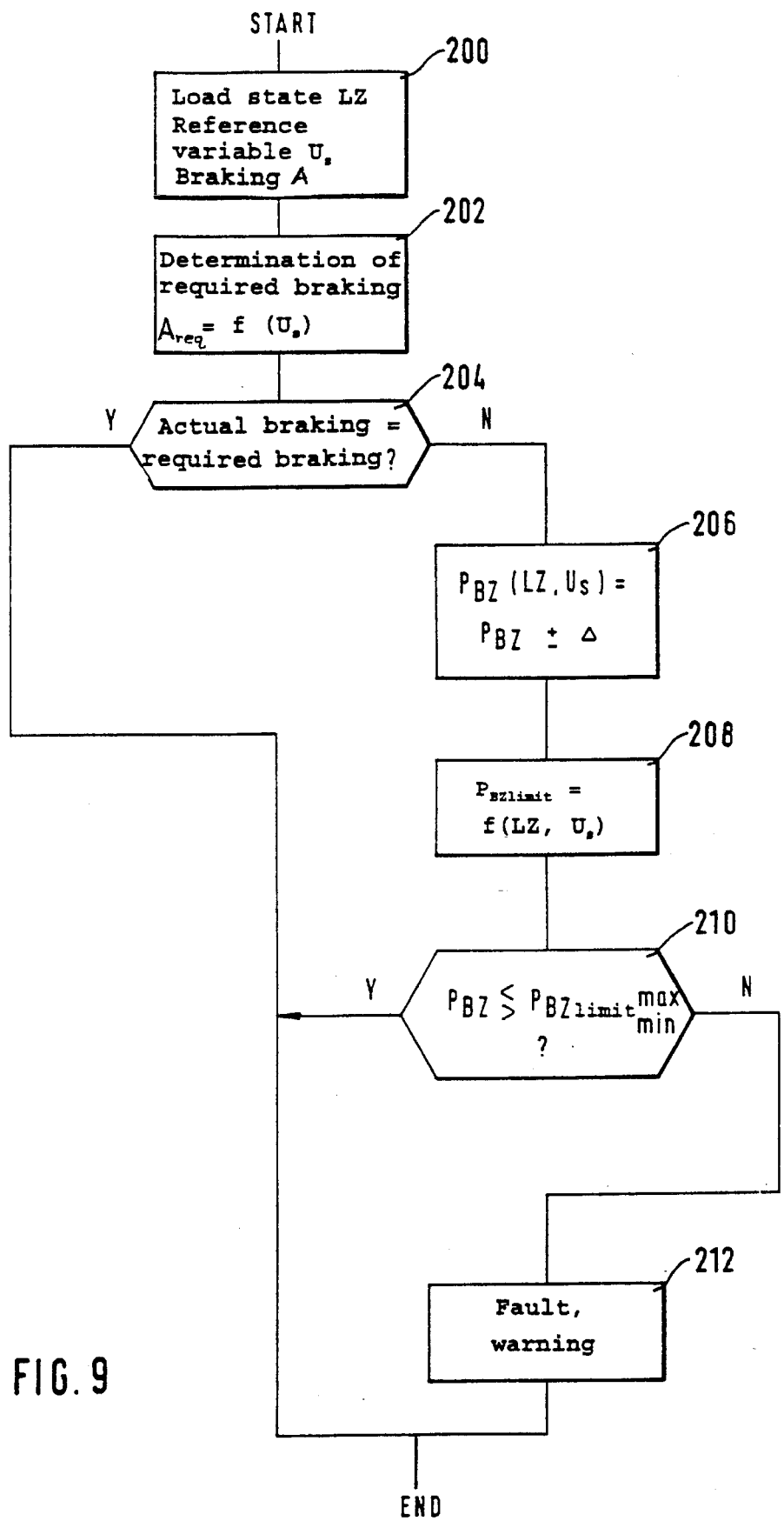
FIG. 9 is a flow chart of steps for adapting the characteristic so that actual braking corresponds to required braking.

FIG. 9 illustrates the procedure for adaptation, using a flow chart for the example of braking for one axle or a wheel brake.

After the program section has been started on brake operation, the load state LZ, the reference variable US and the braking A are read in in a first step 200, having been determined by differentiation of the wheel rotation speeds or the vehicle speed. The required braking Areq is then determined from a predetermined characteristic in step 202 on the basis of the reference value US. A check is carried out in the following decision step 204 to determine whether the actual braking corresponds to the required braking. If this is the case, the program section is ended, since no correction is necessary. If this is not the case, the instantaneous characteristic point for the brake cylinder pressure PBZ is corrected on the basis of the load state LZ and the reference variable Us. As is illustrated in step 206, this can be done by addition or subtraction of a fixed value Δ or by addition and subtraction of a value Δ which is derived from the error between the actual value and the required value of braking. The limit values for the brake cylinder pressure PBZ limit are then determined, in step 208, as a function of the load state and the reference variable and a check is carried out in the following decision step 210 to determine whether the corrected brake cylinder pressure value PBZ is less than or greater than the upper or lower limit value respectively. If this is the case, the program section is ended, and if this is not the case, a fault is confirmed in accordance with step 212 and a warning is possibly emitted to the driver. After this, the program section is ended.

In addition to the illustrated implementation on the basis of a comparison between required and actual braking, the abovementioned required and actual values of the other parameters can be used in other advantageous exemplary embodiments, and the basic family of brake pressure characteristics can thus be matched to simultaneous starting of the braking effects on all the wheel brakes, to uniform brake lining wear, to a predetermined required adhesion of the braked wheels, and to a required value of the brake temperature or the coupling forces.

We claim:

1. Method for regulating brake pressure at the wheels on axles of a vehicle, said method compromising:

measuring an axle load at at least one wheel of at least one axle, determining a load state of the vehicle based on said axle load at said at least one wheel during non-braking operation, determining a braking demand by the driver;

providing characteristic brake pressure profiles which prescribe required brake pressure based on braking demand and load state of the vehicle, determining a characteristic brake pressure profile based on said determined load state of the vehicle during non-braking operation, determining the required brake pressure at said at least one wheel based on said determined characteristic brake pressure profile and said braking demand, and regulating brake pressure at said at least one wheel based on said required brake pressure at said at least one wheel.

2. A method as in claim 1 wherein said characteristic brake pressure profiles are provided during production of the vehicle.

3. A method as in claim 1 wherein at least two characteristic brake pressure profiles for at least two respective load states are provided.

4. A method as in claim 3 wherein said at least two load states represent an empty vehicle and a fully loaded vehicle.

5. A method as in claim 1 wherein said characteristic brake pressure profiles are variable in response to operating parameters of the vehicle.

6. A method as in claim 5 wherein said characteristic brake pressure profiles are variable based on a comparison of required and actual values of the operating parameters.

7. Method as in claim 1 wherein said characteristic brake pressure profiles are provided for groups of wheels, each group having at least one wheel where an axle load has been measured, the required brake pressure at said at least one wheel being based on said characteristic brake pressure for said at least one wheel and the measured axle load of said at least one wheel.

8. Apparatus for regulating brake pressure at the wheels on axles of a vehicle, said apparatus comprising means for determining a load state of the vehicle based on said axle load at said at least one wheel during non-braking operation, means for determining a braking demand by the driver;

means for providing characteristic brake pressure profiles which prescribe required brake pressure based on braking demand and load state of the vehicle, means for determining a characteristic brake pressure profile based on said determined load state of the vehicle during non-braking operation, means for determining the required brake pressure at said at least one wheel based on said determined characteristic brake pressure profile and said braking demand, and means for regulating brake pressure at said at least one wheel based on said required brake pressure at said at least one wheel.

* * * * *